(12) United States Patent
Norberg et al.

(10) Patent No.: US 11,428,646 B2
(45) Date of Patent: Aug. 30, 2022

(54) LOSS MONITORING IN PHOTONIC CIRCUIT FABRICATION

(71) Applicant: OpenLight Photonics, Inc., Goleta, CA (US)

(72) Inventors: Erik Johan Norberg, Santa Barbara, CA (US); Rui Liang, Santa Clara, CA (US); Benjamin M. Curtin, Santa Barbara, CA (US); Jared Bauters, Santa Barbara, CA (US)

(73) Assignee: OpenLight Photonics, Inc., Goleta, CA (US)

( * ) Notice: Subject to any disclaimer, the term of this patent is extended or adjusted under 35 U.S.C. 154(b) by 49 days.

(21) Appl. No.: 17/006,366

(22) Filed: Aug. 28, 2020

(65) Prior Publication Data

US 2022/0065798 A1    Mar. 3, 2022

(51) Int. Cl.
| | |
|---|---|
| *G01N 21/95* | (2006.01) |
| *G01N 21/45* | (2006.01) |
| *G02B 6/13* | (2006.01) |
| *G02F 1/225* | (2006.01) |
| *G02F 1/21* | (2006.01) |

(52) U.S. Cl.
CPC ......... *G01N 21/9505* (2013.01); *G01N 21/45* (2013.01); *G02B 6/13* (2013.01); *G02F 1/225* (2013.01); *G01N 2201/06113* (2013.01); *G01N 2201/08* (2013.01); *G02F 1/212* (2021.01)

(58) Field of Classification Search
CPC .............. G01N 21/9505; G01N 21/45; G01N 2201/06113; G01N 2201/08; G01N 21/84; G02B 6/13; G02B 6/12004; G02B 2006/12061; G02B 6/12002; G02B 6/122; G02F 1/225; G02F 1/212; G01M 11/00; G01M 11/30
See application file for complete search history.

(56) References Cited

U.S. PATENT DOCUMENTS 5,987,196 A  * 11/1999 Noble ................ G02B 6/12004
                                            257/E27.128
6,645,829 B2 * 11/2003 Fitzergald ......... H01L 21/76256
                                            438/455

(Continued)

FOREIGN PATENT DOCUMENTS

| CN | 107077107 A | * | 8/2017 | ............ G05B 13/00 |
| CN | 114114539 A | | 3/2022 | |
| JP | 2022039883 A | | 3/2022 | |

OTHER PUBLICATIONS

"European Application Serial No. 20208734.2, Extended European Search Report dated May 4, 2021", 7 pgs.

*Primary Examiner* — Mohamed K Amara
(74) *Attorney, Agent, or Firm* — Schwegman Lundberg & Woessner, P.A.

(57) ABSTRACT

Optical fabrication monitor structures can be included in a design fabricated on a wafer from a mask or fabrication reticle. A first set of components can be formed in an initial fabrication cycle, where the first set includes functional components and monitor structures. A second set of components can be formed by subsequent fabrication processes that can potentially cause errors or damage to the first set of components. The monitor structures can be implemented during fabrication (e.g., in a cleanroom) to detect fabrication errors without pulling or scrapping the wafer.

20 Claims, 7 Drawing Sheets

(56) References Cited

U.S. PATENT DOCUMENTS

| | | | | |
|---|---|---|---|---|
| 6,647,350 B1* | 11/2003 | Palfenier | ............... | G01J 5/0821 |
| | | | | 702/134 |
| 6,767,751 B2* | 7/2004 | Hunter | ............... | G02B 26/0808 |
| | | | | 438/5 |
| 10,663,282 B1* | 5/2020 | Ogden | ............... | G01B 9/02071 |
| 2004/0114853 A1* | 6/2004 | Bjorkman | .......... | G02B 6/12004 |
| | | | | 385/14 |
| 2005/0023656 A1* | 2/2005 | Leedy | ................. | B81C 1/00238 |
| | | | | 257/678 |
| 2005/0046925 A1* | 3/2005 | MacFarlane | ....... | G02B 6/12004 |
| | | | | 359/333 |
| 2005/0054131 A1* | 3/2005 | Wada | .................... | G02B 6/4214 |
| | | | | 438/31 |
| 2006/0018594 A1* | 1/2006 | Sugitatsu | ............... | B82Y 20/00 |
| | | | | 385/27 |
| 2006/0151784 A1 | 7/2006 | Yang et al. | | |
| 2015/0354938 A1* | 12/2015 | Mower | ................. | B82Y 20/00 |
| | | | | 356/450 |
| 2019/0162628 A1* | 5/2019 | Huang | ............... | G02B 6/12004 |

\* cited by examiner

LOSS MONITORING IN PHOTONIC CIRCUIT FABRICATION

TECHNICAL FIELD

The present disclosure generally relates to optical circuits, and more particularly to optical testing of circuits.

BACKGROUND

During silicon photonic development and manufacturing, the foundry can use in-line electrical measurements and electrical monitor structures to characterize the manufacturing process to ensure the material being delivered is of good quality. A single wafer can be fabricated that includes multiple photonic integrated circuits, which are then singulated into individual dies that undergo final testing. Generally, a portion of the dies have errors that result from the fabrication process and are scrapped after the final tests. For processing of optical components, it is currently challenging or impractical to determine the quality of the wafer using existing process control mechanisms.

BRIEF DESCRIPTION OF THE DRAWINGS

The following description includes discussion of figures having illustrations given by way of example of implementations of embodiments of the disclosure. The drawings should be understood by way of example, and not by way of limitation. As used herein, references to one or more "embodiments" are to be understood as describing a particular feature, structure, or characteristic included in at least one implementation of the inventive subject matter. Thus, phrases such as "in one embodiment" or "in an alternate embodiment" appearing herein describe various embodiments and implementations of the inventive subject matter, and do not necessarily all refer to the same embodiment. However, they are also not necessarily mutually exclusive. To easily identify the discussion of any particular element or act, the most significant digit or digits in a reference number refer to the figure ("FIG.") number in which that element or act is first introduced.

Descriptions of certain details and implementations follow, including a description of the figures, which may depict some or all of the embodiments described below, as well as discussing other potential embodiments or implementations of the inventive concepts presented herein. An overview of embodiments of the disclosure is provided below, followed by a more detailed description with reference to the drawings.

DETAILED DESCRIPTION

In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, structures, and techniques are not necessarily shown in detail.

During silicon photonic fabrication development and manufacturing of photonic circuits, one or more optical components can be damaged by a fabrication cycle (e.g., etching), and the resulting errors may not be detectable until final manufacturing stages. One challenge with photonic fabrication is that there are many different regions in a fabrication reticle that creates the photonic designs, and certain processes may be problematic for the optical waveguide health only in certain regions. This can make it challenging to monitor optical health because optical device test structures are generally placed away from the regions that could be problematic for the optical waveguide health.

Additionally, challenges can arise in monitoring the optical health of a circuit formed from a Si-III-V heterogenous wafer. This difficulty is due at least in part to the underlying Silicon (Si) or Silicon On Insulator (SOI) carrier wafer being prone to damage during the integration and processing of the III-V material and active components formed therefrom (e.g., lasers, amplifiers). It is very difficult to monitor for damage of the underlying Si material (which is generally underneath a III-V layer, which can be of varying thicknesses). It is likewise difficult to monitor for underlying Si material errors in the boundaries of III-V material, as these are typically very narrow and/or small regions that are difficult to reach using in-line inspection techniques. Further, merely placing optical test structures outside of the circuit or in a "passive" area may not sufficiently be indicative of the health of the III-V or "active" regions of the photonic circuit and thus would not detect an issue. As used here, passive regions and components are those in which electrical control of the photonic materials is not used to implement the optical functions of said passive components (e.g., waveguides, couplers). Further, as used here, active regions and components are generally those in which electrical control is applied to cause an optical effect of the component or region (e.g., laser diode, electroabsorption modulator, etc.).

Another challenge with an end-of-line test approach includes the difficulty of using the ports of a photonic circuit for in-line testing, as those device ports are generally configured for specific non-testing related purposes (e.g., for operational functionality of the optical device), and may not be able to be used for in-line wafer level testing in fabrication cycles. For example, in a transmitter photonic circuit with an on-chip laser, it is not practical to test the waveguide from the laser to the output from the chip in the wafer form factor, and it cannot be tested in-line during fabrication because it requires the laser to be biased (e.g., electrically biased), which is not practical during fabrication in-line (e.g., in a clean room). Likewise, for a receiver photonic circuit, it is not easy to test the integrity of the waveguide from the chip input to the photodetector for similar reasons. Additionally, at the wafer level, the physical configuration of the device ports may be accessible at the wafer (e.g., input-output ports on a side of a photonic integrated circuit (PIC) that are not accessible until after die singulation forms the wafer).

One approach is to pull the wafers out of fab (e.g., thereby scrapping or discarding them) and do optical passive measurements (light in and light out using wafer level accessible couplers) in order to monitor the performance/health, but in these approaches, once the wafer is pulled it, cannot be brought into the fabrication facility (e.g., in-line, a clean room). Further, it is very difficult or not possible to use conventional traditional Complementary metal-oxide-semiconductor (CMOS) in-line or electrical test structures to detect optical component errors. Additionally, the lead time to produce optical wafers in a given integrated photonic fabrication flow can be very long, and if a problem is only detected at the end of fabrication, then the feed-back time to improve and develop the process is increased, which translates into long development lead times and more costly developments.

To this end, optical fabrication monitoring structures can be implemented to assess the health of the photonic wafer and further to qualify a process step in-line rather than at the end of the line, thereby saving time and money in design, development, and fabrication of modern optical devices (e.g., high-speed optical transceivers).

One example of a region with an increased risk of errors includes interfaces with large topographies because such interface regions tend to etch faster than other regions, which can lead to 'trenching', which damages components in the underlying layer (e.g., waveguide layer, silicon waveguides, or other components formed in the initial layer). Another region that can be monitored includes under and around heterogeneously bonded materials that are on top of a carrier wafer (e.g., bonded material include IIIV, LiNbo3, bonded dielectrics, etc.). Errors can arise because the bonded material can require special processing to be integrated with the carrier wafer, and the special processing can sometimes damage the underlying material. Another region that can be monitored includes regions where implants are added, where the implants may damage or increase loss in optical waveguides.

In some example embodiments, an optical fabrication monitoring structure can be included in a photonic design to enable in-line testing at the wafer level to evaluate the optical health inside the fab clean room environment. By using the optical fabrication monitoring structures, the optical designs can be tested via measurement in-line, and processing of the wafer can continue without exiting clean room and becoming contaminated.

In some example embodiments, the optical waveguide structures include input and output couplers that are connected by waveguides that are routed through singular or multiple regions of specific fabrication concern (e.g., regions susceptible to damage or perturbations). In some example embodiments, the test structures are formed using grating couplers coupled by a passive waveguide. In some example embodiments, an additional optical fabrication test structure is routed through the same region to provide identical calibration structure insertion loss measurements for those optical monitoring fabrication test structures included entirely within a given photonic integrated circuit.

In some example embodiments, the optical fabrication grating couplers are located inside the photonic circuit with the routing waveguides to monitor one or more portions inside the circuit in the regions of concern. In some example embodiments, an optical fabrication test structure is entirely located outside the photonic circuit but in a region that is identical to the fabrication inside the circuit or mimics the process seen inside the circuit and undergoes the same or similar potential for damage and errors.

In some example embodiments, an optical fabrication monitor structure can be implemented as an asymmetric waveguide structure having multiple arms of different lengths, such as an asymmetric Mach-Zehnder Interferometer (AMZI). In some example embodiments, one of the one of the arms of the AMZI is routed outside the area of concern (e.g., as a calibration arm), and another arm functions as the health monitor waveguide arm, which is routed through the fabrication area or path that needs to be monitored. In this approach, unintended loss that affects the health-monitor waveguide arm will translate into a change in the extinction ratio of the measured AMZI spectral response (e.g., phase change, extinction ratio change) to detect sub-decibel optical losses. Additionally, changes to the length of the waveguide can indicate an error in the region or path. For example, an unexpected change to optical path length (e.g., incurred during the fabrication cycles) will change the FSR and/or the median power for a fixed wavelength supplied to the monitor structure. In these example embodiments, the changed FSR and median power can indicate delay related optical errors where the photonic circuit relies on specific delays and/or lengths of optical paths, according to some example embodiments.

The optical fabrication monitoring structures can thereby be implemented, with in-line measurement, to generate feed-back information (e.g., to detect a bad part, and bin or discard it early in a production cycle) and/or feed-forward information to adapt the process early (e.g., change the thickness of a given layer, the design or components implemented in a design). Benefits of the optical fabrication monitor structures include significantly improving fabrication yield, significantly reducing fabrication costs, and reducing development cycle time of complex photonic designs.

Figure 1:
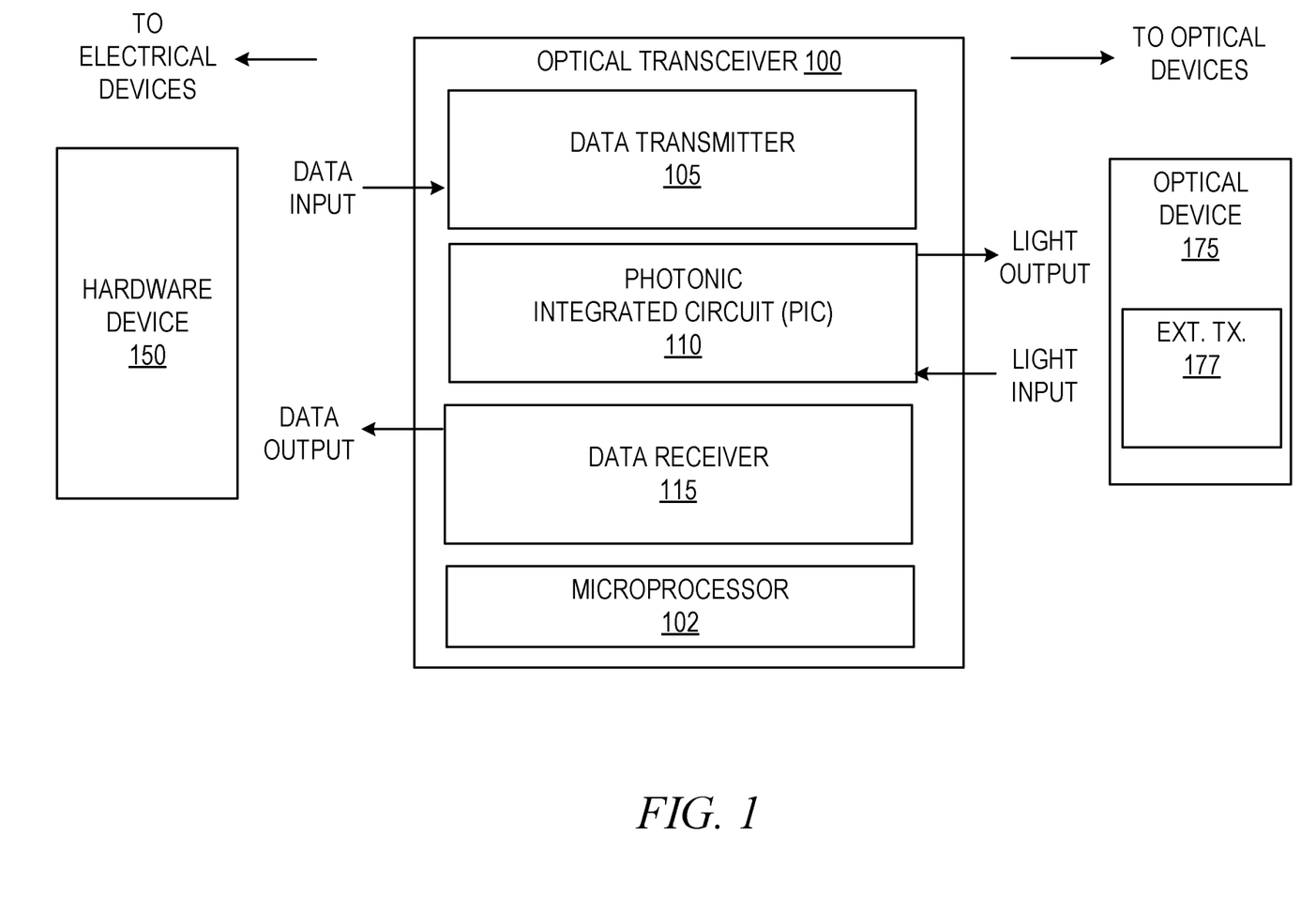
FIG. 1 is a block diagram illustrating an example optical transceiver for transmitting and receiving optical signals, according to some example embodiments.

FIG. 1 is a block diagram illustrating an example optical transceiver 100 for transmitting and receiving optical signals, according to some example embodiments. The optical transceiver 100 is an example photonic device in which it can be difficult or impossible to detect optical errors during in-line fabrication. In the example illustrated in FIG. 1, the optical transceiver 100 processes data from electrical devices, such as electrical hardware device 150, converts the electrical data into optical data, and sends and receives the optical data with one or more optical devices, such as optical device 175. For example, the electrical hardware device 150 can be a host board that "hosts" the optical transceiver 100 as a pluggable device that sends and receives data to an optical switch network; where, for example, optical device 175 can be other components of an optical switch network (e.g., external transmitter 177). However, it is appreciated that the optical transceiver 100 can be implemented to interface with other types of electrical devices and optical devices. For instance, the optical transceiver 100 can be implemented as a single chip on a hybrid "motherboard" that uses an optical network (e.g., waveguides, fibers) as an optical bus to interconnect on-board electrical chips that process the data after it is converted from light into binary electrical data, according to some example embodiments.

In some example embodiments, the hardware device 150 includes an electrical interface for receiving and mating with an electrical interface of the optical transceiver 100. The optical transceiver 100 may be a removable front-end module that may be physically received by and removed from hardware device 150 operating as a backend module within a communication system or device. The optical transceiver 100 and the hardware device 150, for example, can be components of an optical communication device or system (e.g., a network device) such as a wavelength-division multiplexing (WDM) system or a parallel fiber system (e.g., parallel-single fiber (PSM)), according to some example embodiments.

In the example illustrated, the optical transceiver 100 includes a microprocessor 102 that controls electrical circuits (e.g., the data transmitter 105, the data receiver 115) and optical components of the PIC 110. The data transmitter 105 of the optical transceiver 100 can receive the electrical signals, which are then converted into optical signals via the optical transmitter components (e.g., modulator, heater) of a PIC 110. The PIC 110 can then output the optical signals via optical links, such as fiber or waveguides that interface with the PIC 110. The output light data can then be processed by other components (e.g., switches, endpoint servers, other embedded chips of a single embedded system), via a network such as a wide area network (WAN), optical switch network, optical waveguide network in an embedded system, and others.

The PIC 110 (e.g., photodetector) can receive high data rate optical signals via one or more optical links to optical device 175. The optical signals are converted by the optical receiver components from light into electrical signals for further processing by data receiver 115, such as demodulating the data into a lower data rate for output to other devices, such as the electrical hardware device 150. The modulation used by the optical transceiver 100 can include pulse amplitude modulation (e.g., 4-level PAM, such as "PAM4", PAM8, and so on), quadrature phase-shift keying (QPSK), binary phase-shift keying (BPSK), polarization-multiplexed BPSK, M-ary quadrature amplitude modulation (M-QAM), and others.

Figure 2:
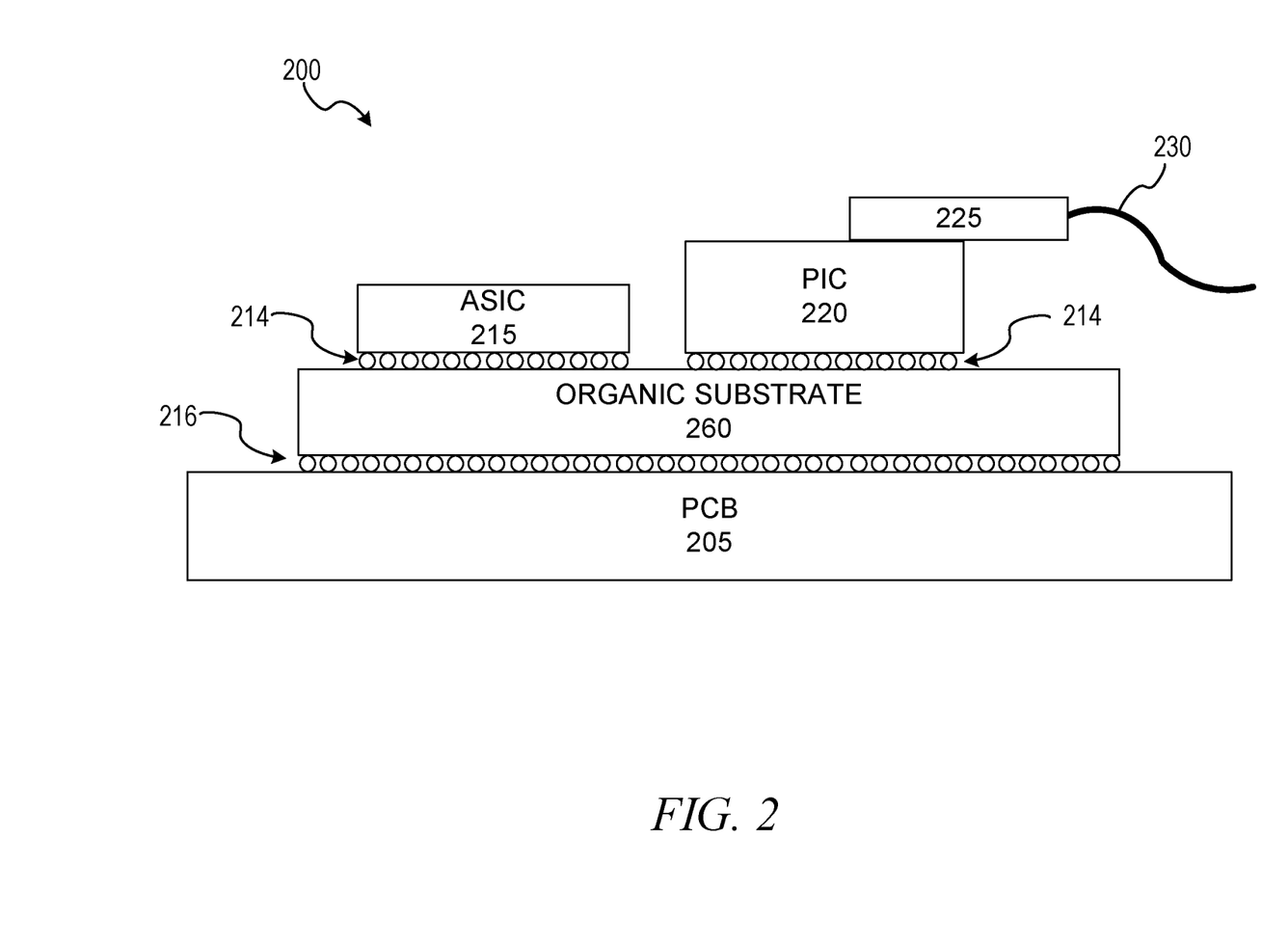
FIG. 2 is an illustration of an optical-electrical device, according to some example embodiments.

FIG. 2 is an illustration of an optical-electrical device 200 including one or more optical devices, according to some example embodiments. In this embodiment, the optical-electrical device 200 is a multi-structure chip package that includes a printed circuit board (PCB) 205, organic substrate 260, application specific integrated circuit 215 (ASIC), and PIC 220. In this embodiment, the PIC 220 may include one or more optical structures described below (e.g., as in FIG. 3).

In some example embodiments, the PIC 220 includes SOI or silicon-based (e.g., silicon nitride (SiN)) devices, or may comprise devices formed from both silicon and a non-silicon material. Said non-silicon material (alternatively referred to as "heterogeneous material") may comprise one of III-V material, magneto-optic (MO)material, or crystal substrate material. III-V semiconductors have elements that are found in group III and group V of the periodic table (e.g., Indium Gallium Arsenide Phosphide (InGaAsP), Gallium Indium Arsenide Nitride (GainAsN)). The carrier dispersion effects of III-V-based materials may be significantly higher than in silicon-based materials, because electron speed in III-V semiconductors is much faster than that in silicon. In addition, III-V materials have a direct bandgap that enables efficient creation of light from electrical pumping. Thus, III-V semiconductor materials enable photonic operations with an increased efficiency over silicon for both generating light and modulating the refractive index of light. Thus, III-V semiconductor materials enable photonic operation with an increased efficiency at generating light from electricity and converting light back into electricity.

The low optical loss and high quality oxides of silicon are thus combined with the electro-optic efficiency of III-V semiconductors in the heterogeneous optical devices described below; in embodiments of the disclosure, said heterogeneous devices utilize low loss heterogeneous optical waveguide transitions between the devices' heterogeneous and silicon-only waveguides. MO materials allow heterogeneous PICs to operate based on the MO effect. Such devices may utilize the Faraday Effect, in which the magnetic field associated with an electrical signal modulates an optical beam, offering high bandwidth modulation, and rotates the electric field of the optical mode and enabling optical isolators. Said MO materials may comprise, for example, materials such as iron, cobalt, or yttrium iron garnet (YIG). Further, in some example embodiments, crystal substrate materials provide heterogeneous PICs with a high electro-mechanical coupling, linear electro optic coefficient, low transmission loss, and stable physical and chemical properties. Said crystal substrate materials may comprise, for example, lithium niobate (LiNbO3) or lithium tantalate (LiTaO3).

In the example illustrated, the PIC 220 exchanges light with fiber 230 via prism 225; said prism 225 is a misalignment-tolerant device used to couple an optical mode to one or more single-mode optical fibers (e.g., to transmit light to and from an optical network), according to some example embodiments. In some example embodiments, the optical devices of PIC 220 are controlled, at least in part, by control circuitry included in ASIC 215. Both ASIC 215 and PIC 220 are shown to be disposed on copper pillars 214, which are used for communicatively coupling the integrated circuits (ICs) via organic substrate 260. PCB 205 is coupled to organic substrate 260 via ball grid array (BGA) interconnect 216, and may be used to interconnect the organic substrate 260 (and thus, ASIC 215 and PIC 220) to other components of optical-electrical device 200 not shown, such as interconnection modules, power supplies, and so forth.

Figure 3:
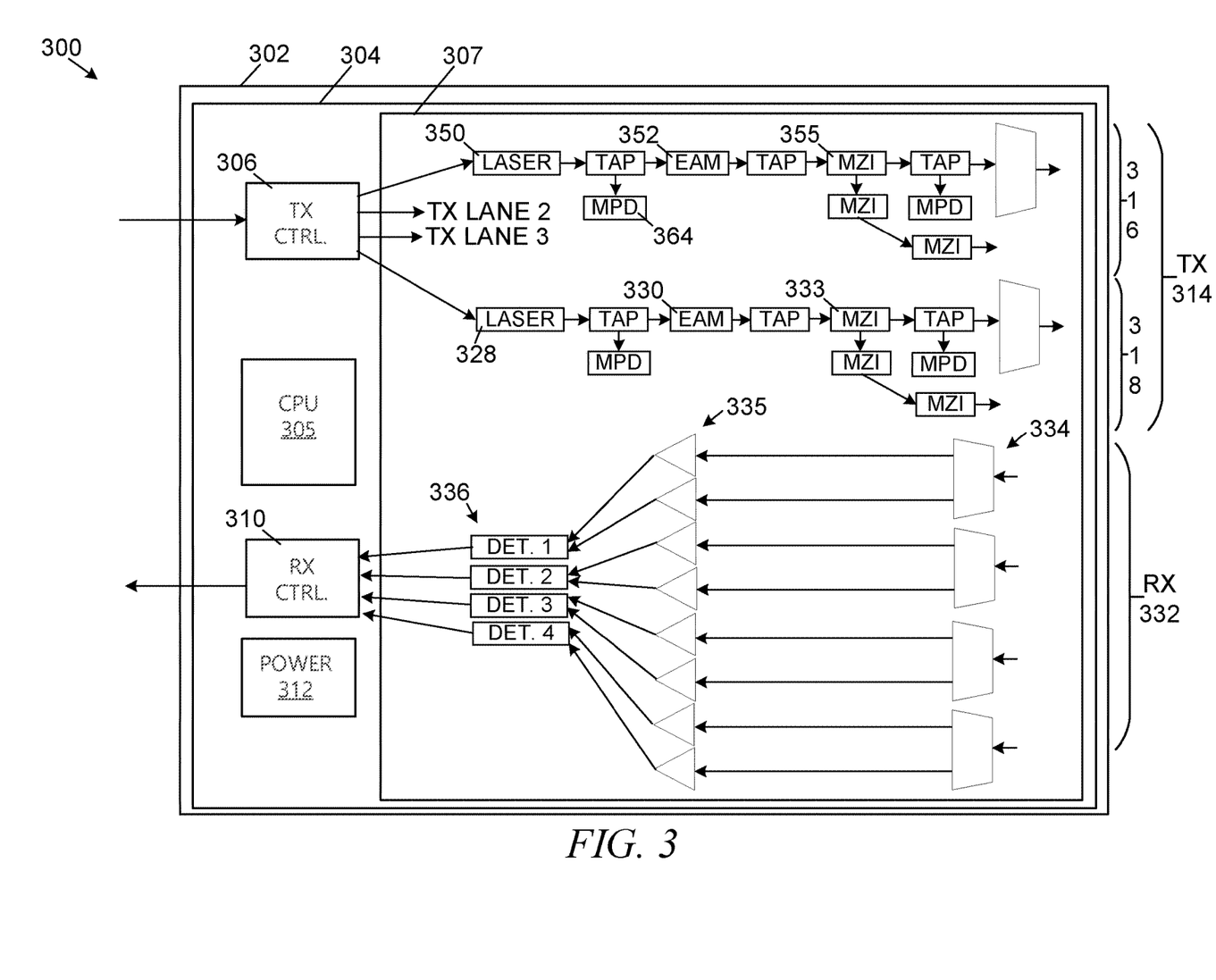
FIG. 3 shows internal architecture of an optical-electrical device, according to some example embodiments.

FIG. 3 shows internal architecture 300 of an optical-electrical device 302, according to some example embodiments. As illustrated, the architecture 300 displays an optical-electrical device 302 that can send and receive optical data, such as optical transceiver 100. The optical-electrical device 302 comprises an electronics module 304 and a photonics module 307. The electronics module 304 includes electrical components (e.g., electrical conduction pathways/traces, circuit control logic, ASICs, processors, power control circuits, etc.), which can be integrated as one or more electrical structures or ASICs in a packaged chip, such as ASIC 215 of FIG. 2. In the example illustrated, the electronics module 304 includes a transmitter controller 306 (e.g., data transmitter 105, FIG. 1) that receives data for optical modulation (e.g., PAM4 data, QPSK data). In some example embodiments, a hardware processor 305 (e.g., a CPU, ASIC, microprocessor) controls different processes of the optical-electrical device 302. The electronics module 304 further includes a receiver controller 310 (e.g., data receiver 115), which can receive optical data generated by the optical receiver components in the photonics module 307. Electronics module 304 can further include a power control circuit 312 to supply and control electrical power for the optical-electrical device 302, including electronic components in the electronics module 304, and further supply electrical power to be photonics module 307 to power various electrically controlled photonic components (e.g., lasers, silicon optical amplifiers, filters, modulators, and so forth).

In some example embodiments, the photonics module 307 is a wavelength division multiplexing transceiver architecture comprising an integrated photonics transmitter structure 314 and an integrated photonics receiver structure 332. In some example embodiments, the integrated photonics transmitter structure 314 and the integrated photonics receiver structure 332 are example optical components fabricated in a PIC device, such as PIC 220 of FIG. 2, discussed above. The integrated photonics transmitter structure 314 is an example of a wavelength division multiplexing transmitter having four lanes, in which each lane handles a different wavelength of light using different optical components including, for example, laser 350, an electro-absorption modulator (EAM) 352, and an MZI 355 in the first transmitter lane 316, and other lanes may include the same or similar components to manage optical data on those lanes (e.g., at different wavelength division multiplexing wavelengths). For brevity, in the example illustrated, only two lanes of the transmitter are illustrated, including the first transmitter lane 316 and the fourth transmitter lane 318; the second and third transmitter lanes are omitted.

The integrated photonics receiver structure 332 is an example of a WDM receiver that receives modulated WDM light (e.g., from an optical network) and processes the light by filtering, amplifying, and converting it to electrical signal using components such as multiplexers 334, semiconductor optical amplifiers (SOAs) 335, and one or more detectors such as photodetectors 336 (e.g., photodiodes).

The photonics module 307 can be fabricated in multiple processes, including first fabricating (e.g., using a mask or reticle) one or more silicon components followed by fabricating active components from III-V layers (e.g., using another mask or reticle). For example, the waveguides connecting the various components in the photonics module 307 (e.g., illustrated as arrows) can be etched from silicon, and other components such as MZI 355 and MZI 333 can likewise be etched from silicon; while other components, such as the lasers (e.g., laser 328, 350), monitor photodiodes (e.g., monitor photodiode 364), and photodetectors 336 can be subsequently fabrication in a subsequent fabrication cycle from a III-V material after the silicon components (e.g., waveguides are etched). In some cases, in fabricating the later components (e.g., active components), one or more of the earlier formed components (e.g., Si components) can be damaged, which may cause failure of the components or the entire photonics module 307. To this end, one or more optical fabrication monitor structures can be used in-line during the fabrication process to test whether the photonics module 307 has damaged regions, as further discussed below.

Figure 4:
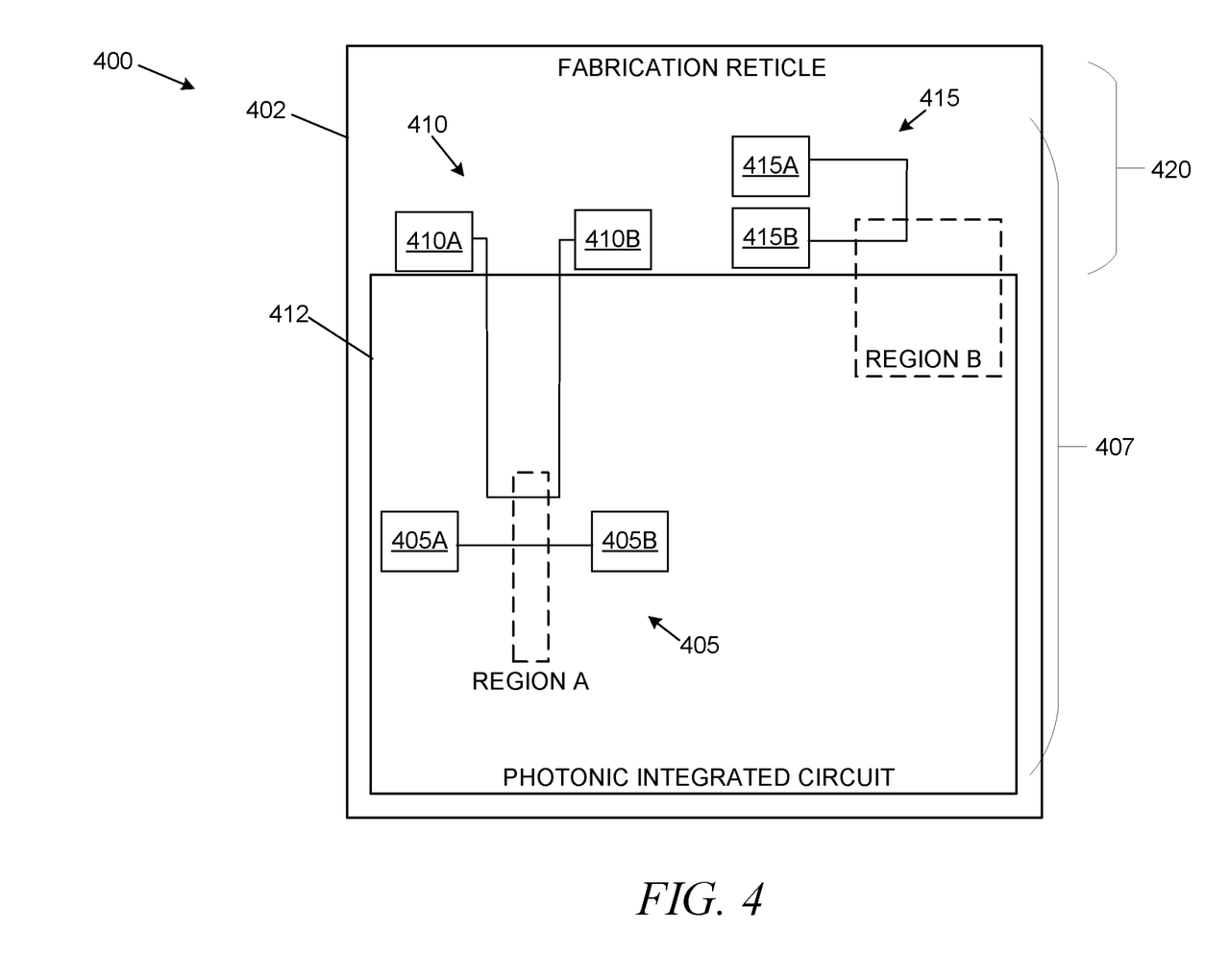
FIG. 4 shows an example optical fabrication monitor architecture, according to some example embodiments.

FIG. 4 shows an example optical fabrication monitor architecture 400, according to some example embodiments. A fabrication reticle 402 is implemented to form a photonic layout design 407 on a wafer one or more times to create photonic designs on the wafer. Portions of the created photonic designs are then singulated as separate photonic integrated circuits and an excess portion 420 of the wafer, such as photonic integrated circuit 412. For example, the photonic integrated circuit 412 is an example implementation of the photonics module 307 or PIC 220, in which a portion of the components are fabricated using a first fabrication process (e.g. silicon etching to form waveguides in the photonics module 307), and in which a second fabrication process forms additional components (e.g., active layer components in the photonics module 307 fabricated from III-V material), where the fabrication of the additional components can cause errors in the first components (e.g., trenching, damaged waveguides, bond interface damage).

To monitor and detect errors in-line during fabrication, one or more optical fabrication monitor structures are included in the layout design and fabricated by the fabrication reticle 402 along with the waveguides and other components formed in an initial layer for etching (e.g., silicon layer). In particular, for example, Region A and Region B may be regions that are susceptible to damage or fabrication errors. For example, Region A can include components fabricated in a III-V layer (e.g., lasers 328, laser 350) and Region B can include other components fabricated from the III-V layer (e.g., EAM 330, EAM 352), where fabrication of the components in Region A and Region B may cause damage to existing components within or proximate to Region A and Region B (e.g., silicon etched waveguides coupled to the lasers or EAMs; or damage to other previously created components in the silicon layer such as MZI 333, 355).

Optical fabrication monitor structures 405, 410, 415 can be included in the layout design to detect errors during in-line fabrication, without scrapping the wafer or photonic circuit, according to some example embodiments. For example, to monitor region A during fabrication, the optical fabrication monitor structure 405, and additionally, the optical fabrication monitor structure 410, can route light through region A to detect optical losses caused by fabrication damage processes, according to some example embodiments. In some example embodiments, light is coupled into a given optical fabrication waveguide monitor structure and received from the structure in-line (e.g., without removing the wafer from the fabrication system) via one or more of a fiber, a prism, a fiber focuser, a lens, or module having an input mechanism and output mechanism (e.g., a probe card having an fiber to couple light to the waveguide, and output grating and detector to receive light out of the waveguide).

In the example illustrated, optical fabrication monitor structure 405 includes two couplers 405A and 405B (e.g., grating couplers), which are coupled via a passive silicon waveguide (e.g., a health waveguide separate from functional components of the device, as indicated by the solid line connecting the couplers 405A and 405B). After singulation, the separated individual PIC 412 (e.g., PIC 220) will include the optical fabrication monitor structure 405. In some example embodiments, a portion of the optical fabrication monitor structure can be separated after singulation such that the portion of the structure is not included with the singulated photonic integrated circuit 412. For example, the optical fabrication monitor structure 410 includes two couplers 410A and 410B, which are connected by a waveguide that begins outside the photonic integrated circuit 412 and extends into region A to detect possible damage or errors occurring from fabrication processes within or proximate to region A. After singulation of photonic integrated circuit 412, grating couplers 410A and 410B are separated from the photonic integrated circuit 412 and only the waveguide (the solid line) remains with the photonic integrated circuit 412, thereby saving layout space within the photonic integrated circuit 412. Additionally, and in accordance with some example embodiments, placing a portion of the structure outside the photonic integrated circuit 412 enables the structure to be utilized as a test reference to ensure that test structures themselves are not causing loss and incorrectly causing erroneous test readings. For example, the optical fabrication monitor structure 405 can receive and output light, and loss can be measured and evaluated against the loss exhibited by optical fabrication monitor structure 410, which functions as a calibration fabrication waveguide monitor structure. In the case where optical fabrication monitor structure 405 exhibits significant loss, and the optical fabrication monitor structure 410 does not exhibit significant loss, the loss can then be attributed to one or more components of the test structure itself (e.g. an incorrectly formed grating coupler of optical coupler 405A).

In some example embodiments, some or all of the optical fabrication monitor structure is fabricated such that it lies outside the photonic integrated circuit 412 but is still in a region that undergoes processes that can cause damage within the photonic integrated circuit 412. For example, region B may be a region with an increased probability of sustaining damage during fabrication processes, where a portion of region B that undergoes the potentially damaging fabrication processes lies outside the photonic integrated circuit 412. As illustrated, optical fabrication monitor structure 415 is designed as part of the layout such that it is completely external to the photonic integrated circuit 412 but has a waveguide connecting couplers 415A and 415B such that if damage is sustained by one or more components in region B, the waveguide within the optical fabrication monitor structure 415 also sustains damage. For example, damage can be indicated by optical loss by inputting light into the optical coupler 415A propagating through the waveguide to the optical coupler 415B and measuring the loss (e.g., loss greater than what is expected based on the light input). Notably, after singulation of the photonic integrated circuit 412, the optical fabrication monitor structure 415 is external to the photonic integrated circuit 412 and is not included in the final singulated die.

In some example embodiments, one or more of the optical fabrication monitor structures are fabricated with an integrated light source and detector to generate light and detect the light in a self-contained approach (e.g., without having to input light into a coupler and receive the light from another coupler). For example, the coupler 410A can be replaced with an integrated laser (e.g., hybrid laser formed partially from III-V material) and the coupler 410B can be replaced with an integrated photodiode to detect light generated by the integrated laser that propagates through the monitoring region (e.g., region A) via the health wave guide of the optical fabrication monitor structure 410.

To initiate testing of a self-contained optical fabrication monitor structure, the laser and detector can be probed via electrical probing, which may be easier fabrication foundries to test using in-line standard electronic PCM electrical probe test, according to some example embodiments. Further, as with the coupler based optical fabrication monitor structures (e.g., in which light in injected and output via grating couplers), the self-contained optical fabrication monitor structures do not require additional fabrication effort as they are formed as part of the same design as functional optical components of the photonic design, such as transceiver components of the photonics transmitter structure 314 (e.g., lasers, MZIs, EAMs) and receiver components of photonics receiver structure 332 (e.g., SOAs, detectors, etc.), as discussed above with reference to FIG. 3.

Figure 5:
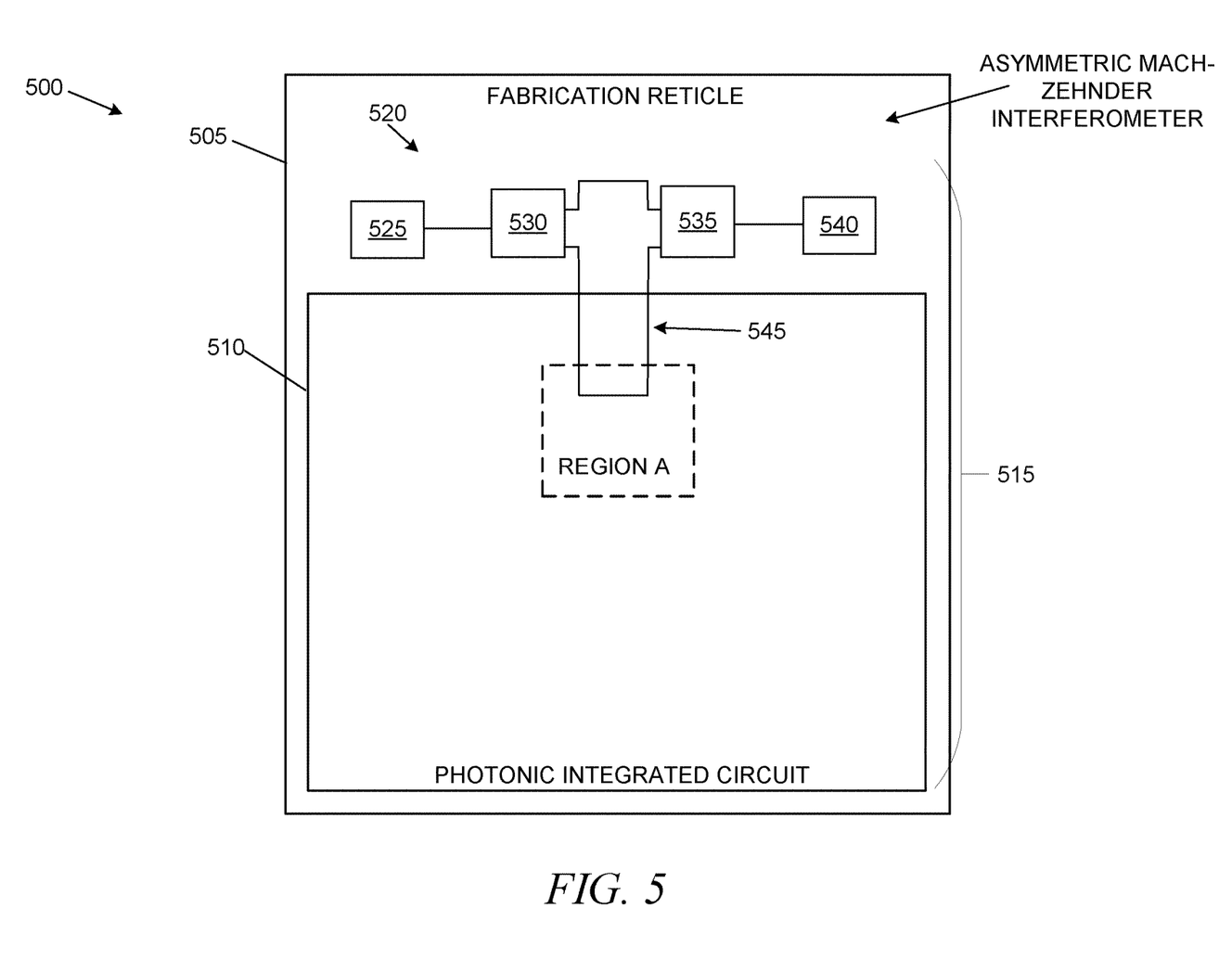
FIG. 5 shows an example optical fabrication monitor architecture, according to some example embodiments.

FIG. 5 shows an example optical fabrication monitor architecture 500, according to some example embodiments. The fabrication reticle 505 is implemented to form a photonic layout design 515 on a wafer one or more times to create photonic designs on the wafer. Portions of the created photonic design is then singulated as separate photonic integrated circuits, such as photonic integrated circuit 510. For example, the photonic integrated circuit 510 is an example implementation of the photonics module 307 or PIC 220, in which a portion of the components are fabricated using a first fabrication process (e.g. silicon etching to form waveguides in the photonics module 307), and in which a second fabrication process forms additional components (e.g., active layer components in the photonics module 307 fabricated from III-V material), where the fabrication of the additional components can cause errors in the first components (e.g., trenching, damaged waveguides, bond interface damage).

In the example of FIG. 5, optical fabrication monitoring structure 520 is an MZI that is etched predominantly in the fabrication reticle region outside the photonic integrated circuit 510. As illustrated, the optical fabrication monitoring structure 520 includes an input coupler 525 (e.g., grating coupler, which couples light into coupler 530 (e.g., a T-junction, 1×2 coupler) which couplers light into coupler 535 (e.g., a T-junction, 2×1 coupler). The coupler 535 then couples the light to output coupler 540 (e.g., grating coupler) for phase-based or extinction ratio based error measurement. In these example embodiments, the optical fabrication monitoring structure 520 can provide sub-decibel level detection of fabrication errors by detecting phase changes from an initial phase change (measured after the AMZI is created and before further fabrication cycle) or extinction ratio changes due to damage to a lower arm 545 that extends into the damage-susceptible area of region A of the photonics integrated circuit 510. After singulation of the photonics integrated circuit 510, a majority of the optical fabrication monitoring structure 520 is separated, and only the lower arm 545 is included with the separated photonic integrated circuit 510. Further, in some example embodiments, one or more of the optical fabrication monitoring structures of FIG. 5 is implemented as a self-contained optical fabrication monitor structures in which an integrated light source and/or detector is included in the monitor structure layout, as discussed above with reference to FIG. 4.

Figure 6:
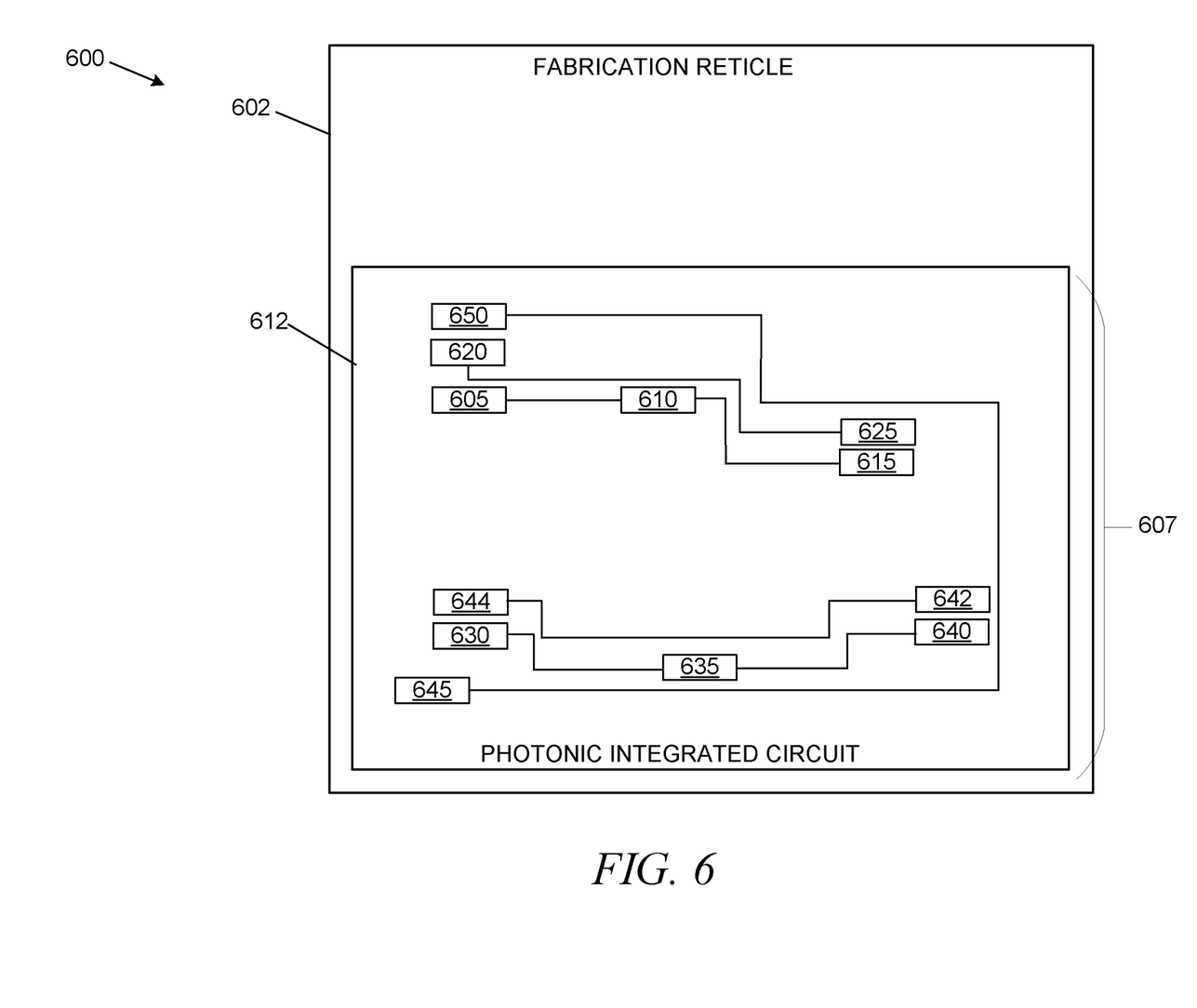
FIG. 6 shows an example optical fabrication monitor architecture, according to some example embodiments.

FIG. 6 shows an example optical fabrication monitor architecture 600, according to some example embodiments. The fabrication reticle 602 is implemented to form a photonic layout design 607 on a wafer one or more times to create photonic designs on the wafer. Portions of the created photonic designs are then singulated as separate photonic integrated circuits, such as photonic integrated circuit 612. For example, the photonic integrated circuit 612 is an example implementation of the photonics module 307 or PIC 220, in which a portion of the components are fabricated using a first fabrication process (e.g. silicon etching to form waveguides in the photonics module 307), and in which a second fabrication process forms additional components (e.g., active layer components in the photonics module 307 fabricated from III-V material), where the fabrication of the additional optical components can cause errors in the first components (e.g., trenching, damaged waveguides, bond interface damage).

In the example of FIG. 6, one or more optical fabrication test structures can be implemented to perform in-line tests of a transmitter portion of the photonic integrated circuit 612 during fabrication, the receiver portion of the photonic integrated circuit 612 during fabrication, or the entire transceiver circuit of the photonic integrated circuit 612 during fabrication, according to some example embodiments.

In the illustrated example, the transmitter components include a laser 605, which is coupled to an optical modulator 610, which is coupled to an optical output coupler 615 of the transmitter. The transmitter optical fabrication test structure can detect losses or damage to the transmitter implementing a waveguide that is proximate to the transmitter portion of the photonic integrated circuit 612. For example, the transmitter optical fabrication test structure can include test coupler 620 and 625 connected by a silicon waveguide that is designed as part of the layout to remain proximate to the transmitter path of the transmitter components. During fabrication, the transmitter portion can be tested and monitored by inputting light into the coupler 620 and detecting light by the coupler 625 and loss, which indicates potential damage to one or more components of the transmitter.

In FIG. 6, the receiver components include an input coupler 640, which couples light to an amplifier 635, which further couples alike to a photodetector 630. The receiver optical fabrication test structure can detect losses or damage to the transmitter implementing a waveguide that is proximate to the receiver portion of the photonic integrated circuit 612. For example, the receiver optical fabrication test structure can include test coupler 642 and 644 connected by a silicon waveguide that is designed as part of the layout to remain proximate to the receiver path of the receiver components. During fabrication, the receiver portion can be tested and monitored in-line, without scrapping or pulling from the line, by inputting light into the coupler 642 and detecting light by the coupler 644 to detect loss, which indicates potential damage to one or more components of the receiver.

Further, the entire photonics integrated circuit 612 can be monitored in-line during fabrication using a transceiver optical fabrication test structure including an input coupler 645 and an output coupler 650 connected by a passive silicon waveguide that surrounds the receiver and the transmitter portions of the photonic integrated circuit 612, according to some example embodiments. During fabrication, the photonics integrated circuit can be monitored using the optical test structure by inputting light into the coupler 645 and detecting light output by the coupler 650 to detect loss, which indicates potential damage to the one or more components of the transceiver. In this way, during fabrication of a complex high speed optical transceiver, the receiver can be tested in-line, the transmitter can be tested in-line, and the entire transceiver can be tested in-line without scrapping or contamination, thereby enabling early binning of parts and changes to fabrication processes or photonic layouts.

Further, in some example embodiments, one or more of the optical fabrication monitoring structures of FIG. 6 is implemented as a self-contained optical fabrication monitor structures in which an integrated light source and/or detector is included in the monitor structure layout, as discussed above with reference to FIG. 4.

Figure 7:
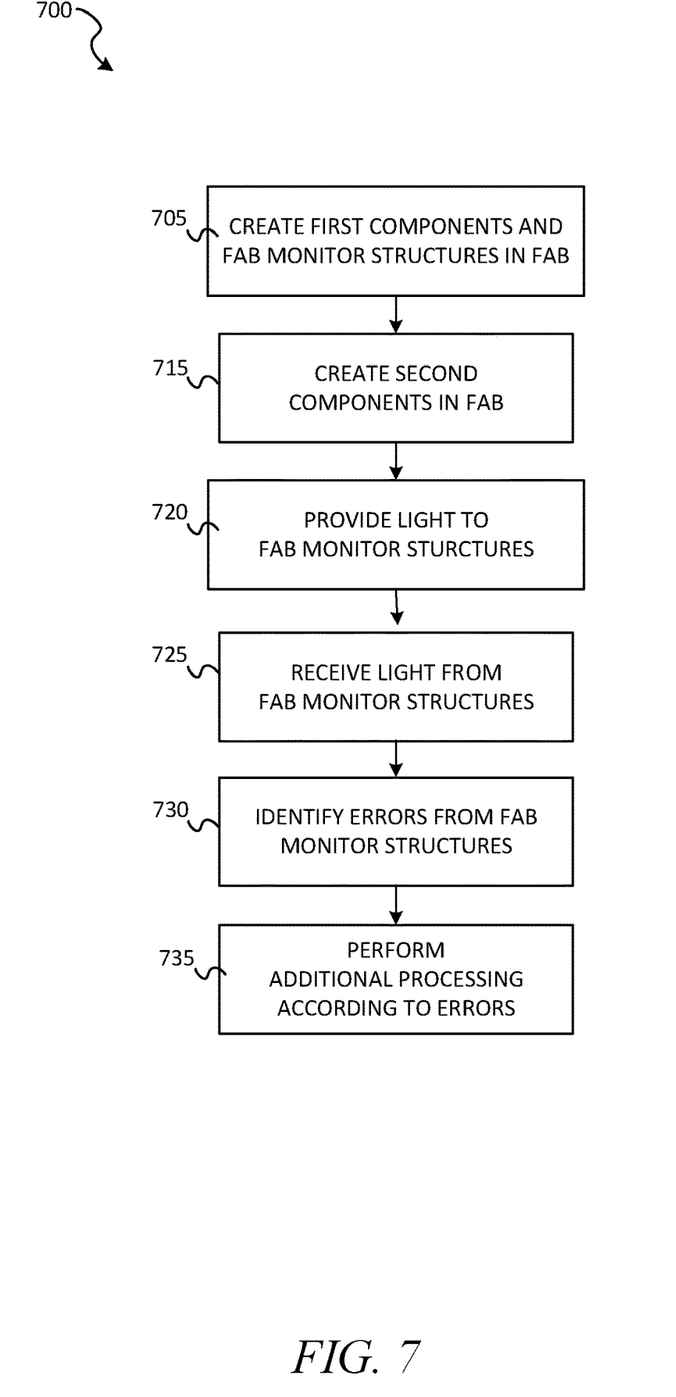
FIG. 7 shows a flow diagram of a method for implementing optical fabrication test structures, according to some example embodiments.

FIG. 7 shows a flow diagram of a method 700 for implementing optical fabrication test structures, according to some example embodiments. At operation 705, the first components of the photonic integrated circuit and one or more optical fabrication monitor structures are created during fabrication of the photonics integrated circuit. For example, at operation 705, an initial silicon layer is etched to create one or more optical components (e.g. passive components such as an MZI, and/or waveguides to connect the components of the photonic integrated circuit). Further, during the initial silicon etching, one or more optical fabrication test structures are included to monitor the optical components during fabrication in the clean room as discussed above.

At operation 715, a second set of components are created on the wafer (e.g., via a fabrication reticle). In creating the second components, one or more of the components created during operation 705 may be damaged, as discussed above.

At operation 720, to detect damage from one or more fabrication cycles, light is provided to the fabrication monitor optical structures, which is then received at operation 725. At operation 730, one or more errors are detected as indicated by the received light from the optical fabrication test structures. For example, received light can indicate that there is significant optical loss within one or more regions susceptible to fabrication damage. Further, damage can be detected based on the extinction ratio of an MZI test structure changing or increasing (e.g., increasing passed a designed or previous MZI extinction ratio.

At operation 735, additional processing is performed according to the errors. For example, in some example embodiments, depending on the errors or type of damage detected, the wafer or the photonic circuit may be scrapped or otherwise discarded. Additionally, in some example embodiments, at operation 735, the fabrication techniques implemented to create photonic circuits may be modified to avoid further errors as detected at operation 730. For example, the type of masking, the type of etchant, the type of adhesive, layout or design of the photonic circuit, or thickness of layers is modified to avoid further fabrication errors of a given layout design (of a given fabrication reticle or mask).

The following are example embodiments:

Example 1

A method for measuring optical component errors during fabrication of a photonic integrated circuit, the method comprising: fabricating, on a silicon layer of the photonic integrated circuit, a plurality of optical components using an initial fabrication cycle in a fabrication environment, the plurality of optical components including functional optical components to process light in the photonic integrated circuit and fabrication waveguide monitor structures to measure damage to one or more regions of the photonic integrated circuit that are susceptible to damage caused by a subsequent fabrication cycle process to form the photonic integrated circuit; fabricating, in another layer of the photonic integrated circuit, a plurality of additional optical components using the subsequent fabrication cycle in the fabrication environment, the plurality of additional optical components being included in the one or more regions that are susceptible to damage from the subsequent fabrication cycle; and identifying, in the fabrication environment, damage to the one or more regions of the silicon layer caused by the subsequent fabrication cycle, the damage measured from light propagating through one of the fabrication waveguide monitor structures formed from the initial fabrication cycle.

Example 2

The method of example 1, wherein the fabrication waveguide monitor structures are separated from the functional optical components that process light according to a design of the photonic integrated circuit.

Example 3

The method of any of examples 1 or 2, wherein each of the fabrication wave guide monitor structures include an integrated light source and photodetector that are connected by one or more waveguides.

Example 4

The method of any of examples 1-3, wherein each of the fabrication wave guide monitor structures include an input coupler and an output coupler to receive and output light at a wafer level before singulation.

Example 5

The method of any of examples 1-4, wherein the input coupler is an input grating coupler and the output coupler is an output grating coupler.

Example 6

The method of any of examples 1-5, wherein the photonic integrated circuit is formed from a wafer; and wherein one or more of the fabrication waveguide monitor structures are formed, via the initial fabrication cycle, in an area that is external to a photonic integrated circuit area to be separated from the wafer.

Example 7

The method of any of examples 1-6, wherein a first fabrication waveguide monitor structure has couplers located in the external area and has a wave guide path through a region of the one or more regions susceptible to damage.

Example 8

The method of any of examples 1-7, wherein a second fabrication wave guide monitor structure has couplers located within the photonic integrated circuit and has a second waveguide that passes through the region from the one or more regions susceptible to damage.

Example 9

The method of any of examples 1-8, wherein the first fabrication waveguide monitor structure is a calibration fabrication waveguide monitor structure against which optical loss of the second fabrication waveguide monitor structure can be measured to detect the damage to the region of the one or more regions.

Example 10

The method of any of examples 1-9, wherein one of the fabrication wave guide monitor structures is an external fabrication waveguide monitor structure including input and output couplers and a health waveguide that are included within the external area and excluded from the photonic integrated circuit.

Example 11

The method of any of examples 1-10, wherein the subsequent fabrication cycle is applied to a portion of the photonic integrated circuit and also to another portion in the external area that is external to the photonic integrated circuit.

Example 12

The method of any of examples 1-11, wherein the external fabrication waveguide monitor structure is damaged by application of the subsequent fabrication cycle and the damage to the photonic integrated circuit is measured via inputting and measuring light propagating through a damaged portion of the external fabrication waveguide monitor structure.

Example 13

The method of any of examples 1-12, wherein one of fabrication waveguide monitor structures is a Mach-Zehnder Interferometer formed from the initial fabrication cycle, the Mach-Zehnder Interferometer having an upper arm in an area external to the photonic integrated circuit and a lower arm that extends through at least one of the regions susceptible to damage from the subsequent fabrication cycle.

Example 14

The method of any of examples 1-13, wherein damage is detected based on a faulty extinction ratio of light input to the Mach-Zehnder Interferometer, the faulty extinction ratio being an extinction ratio caused by damage to the lower arm that extends through the at least one of the regions that is susceptible to damage.

Example 15

The method of any of examples 1-14, wherein light is input into one or more of the fabrication waveguide monitor structures using a fiber focuser.

Example 16

The method of any of examples 1-15, wherein the fabrication environment is a fabrication cleanroom for fabrication of wafers that include multiple photonic integrated circuits formed from a fabrication reticle.

Example 17

The method of any of examples 1-16, wherein the damage to the one or more regions is performed in-line in the fabrication cleanroom and without removing the photonic integrated circuit from the fabrication cleanroom.

Example 18

The method of any of examples 1-17, further comprising: discarding the photonic integrated circuit based on the damage caused to the one or more regions from the subsequent fabrication cycle in the fabrication environment.

Example 19

The method of any of examples 1-18, wherein the plurality of optical components include waveguides and optical couplers; and wherein the plurality of additional optical components include lasers and modulators.

Example 20

A photonic integrated circuit on a wafer that includes one or more fabrication waveguide monitor structures, the wafer comprising: a photonic integrated circuit comprising a plurality of optical components formed in a silicon layer of the wafer using an initial fabrication cycle in a fabrication environment, the plurality of optical components including functional silicon optical components to process light in the photonic integrated circuit and fabrication waveguide monitor structures to measure damage to one or more regions in the wafer that are susceptible to damage caused by a subsequent fabrication process to form a plurality of additional optical components in the photonic integrated circuit, wherein the plurality of additional optical components are formed in an additional layer of the photonic integrated circuit using the subsequent fabrication cycle in the fabrication environment, the plurality of additional optical components being included in the one or more regions that are susceptible to damage from the subsequent fabrication cycle; and an excess region that is external to the photonic integrated circuit, the excess region separated from the photonic integrated circuit by singulating the wafer, at least one of the fabrication waveguide monitor structures being formed, using the initial fabrication cycle, in the photonic integrated circuit and the excess region such that the photonic integrated circuit comprises a partial portion of the at least one of the fabrication waveguide monitor structures, the fabrication waveguide monitor structures including a waveguide to propagate light through the one or more regions to identify damage caused by the subsequent fabrication cycle.

In the foregoing detailed description, the method and apparatus of the present inventive subject matter have been described with reference to specific exemplary embodiments thereof. It will, however, be evident that various modifications and changes may be made thereto without departing from the broader spirit and scope of the present inventive subject matter. The present specification and figures are accordingly to be regarded as illustrative rather than restrictive.

What is claimed is:

1. A method for detecting optical component errors during fabrication of a photonic integrated circuit, the method comprising:
   fabricating, on a silicon layer of the photonic integrated circuit, a plurality of optical components using an initial fabrication cycle in a fabrication environment, the plurality of optical components including functional optical components to process light in the photonic integrated circuit and one or more fabrication waveguide monitor structures to detect damage to one or more regions of the photonic integrated circuit that are susceptible to damage caused by a subsequent fabrication cycle process to form the photonic integrated circuit, the one or more fabrication waveguide monitor structures comprising a Mach-Zehnder Interferometer having an upper arm in an area external to the photonic integrated circuit and a lower arm that extends through at least one of the regions susceptible to damage from the subsequent fabrication cycle;
   fabricating, in another layer of the photonic integrated circuit, a plurality of additional optical components using the subsequent fabrication cycle in the fabrication environment, the plurality of additional optical components being included in the one or more regions that are susceptible to damage from the subsequent fabrication cycle; and
   identifying, in the fabrication environment, damage to the one or more regions of the silicon layer caused by the subsequent fabrication cycle, the damage detected from light propagating through the Mach-Zehnder Interferometer.

2. The method of claim 1, wherein the one or more fabrication waveguide monitor structures are separated from the functional optical components that process light according to a design of the photonic integrated circuit.

3. The method of claim 1, wherein each of the one or more fabrication waveguide monitor structures include an integrated light source and photodetector that are connected by one or more waveguides.

4. The method of claim 1, wherein each of the one or more fabrication waveguide monitor structures include an input coupler and an output coupler to receive and output light at a wafer level before singulation.

5. The method of claim 4, wherein the input coupler is an input grating coupler and the output coupler is an output grating coupler.

6. The method of claim 1, wherein the photonic integrated circuit is formed from a wafer; and
   wherein one or more of the one or more fabrication waveguide monitor structures are formed, via the initial fabrication cycle, in an area that is external to a photonic integrated circuit area to be separated from the wafer.

7. The method of claim 6, wherein a first fabrication waveguide monitor structure has couplers located in the external area and has a waveguide path through a region of the one or more regions susceptible to damage.

8. The method of claim 7, wherein a second fabrication waveguide monitor structure has couplers located within the photonic integrated circuit and has a second waveguide that passes through the region from the one or more regions susceptible to damage.

9. The method of claim 8, wherein the first fabrication waveguide monitor structure is a calibration fabrication waveguide monitor structure against which optical loss of the second fabrication waveguide monitor structure can be measured to detect the damage to the region of the one or more regions.

10. The method of claim 6, wherein one of the one or more fabrication waveguide monitor structures is an external fabrication waveguide monitor structure including input and output couplers and a health waveguide that are included within the external area and excluded from the photonic integrated circuit.

11. The method of claim 10, wherein the subsequent fabrication cycle is applied to a portion of the photonic integrated circuit and also to another portion in the external area that is external to the photonic integrated circuit.

12. The method of claim 11, wherein the external fabrication waveguide monitor structure is damaged by application of the subsequent fabrication cycle and the damage to the photonic integrated circuit is detected via inputting and measuring light propagating through a damaged portion of the external fabrication waveguide monitor structure.

13. The method of claim 1, wherein damage is detected based on a faulty extinction ratio of light input to the Mach-Zehnder Interferometer, the faulty extinction ratio being an extinction ratio caused by damage to the lower arm that extends through the at least one of the regions that is susceptible to damage.

14. The method of claim 1, wherein light is input into the one or more fabrication waveguide monitor structures using a fiber focuser.

15. The method of claim 1, wherein the fabrication environment is a fabrication cleanroom for fabrication of wafers that include multiple photonic integrated circuits formed from a fabrication reticle.

16. The method of claim 15, wherein the damage to the one or more regions is performed in-line in the fabrication cleanroom and without removing the photonic integrated circuit from the fabrication cleanroom.

17. The method of claim 1, further comprising:
   discarding the photonic integrated circuit based on the damage caused to the one or more regions from the subsequent fabrication cycle in the fabrication environment.

18. The method of claim 1, wherein the plurality of optical components include waveguides and optical couplers; and wherein the plurality of additional optical components include lasers and modulators.

19. A photonic integrated circuit on a wafer that includes one or more fabrication waveguide monitor structures, the wafer comprising:

a photonic integrated circuit comprising a plurality of optical components formed in a silicon layer of the wafer using an initial fabrication cycle in a fabrication environment, the plurality of optical components including functional silicon optical components to process light in the photonic integrated circuit and the one or more fabrication waveguide monitor structures to detect damage to one or more regions in the wafer that are susceptible to damage caused by a subsequent fabrication process to form a plurality of additional optical components in the photonic integrated circuit, wherein the plurality of additional optical components are formed in an additional layer of the photonic integrated circuit using the subsequent fabrication cycle in the fabrication environment, the plurality of additional optical components being included in the one or more regions that are susceptible to damage from the subsequent fabrication cycle, the one or more fabrication waveguide monitor structures comprising a Mach-Zehnder Interferometer having an upper arm in an area external to the photonic integrated circuit and a lower arm that extends through at least one of the regions susceptible to damage from the subsequent fabrication cycle; and an excess region that is external to the photonic integrated circuit, the excess region separated from the photonic integrated circuit by singulating the wafer, at least one of the fabrication waveguide monitor structures being formed, using the initial fabrication cycle, in the photonic integrated circuit and the excess region such that the photonic integrated circuit comprises a partial portion of the at least one of the fabrication waveguide monitor structures, the fabrication waveguide monitor structures including a waveguide to propagate light through the one or more regions to identify damage caused by the subsequent fabrication cycle.

20. A photonic integrated circuit on the wafer of claim 19, wherein damage is detected based on a faulty extinction ratio of light input to the Mach-Zehnder Interferometer, the faulty extinction ratio being an extinction ratio caused by damage to the lower arm that extends through the at least one of the regions that is susceptible to damage.

* * * * *